April 21, 1953            J. H. ROE            2,635,514

FOCUSING MECHANISM

Filed Nov. 3, 1951            3 Sheets-Sheet 1

INVENTOR
JOHN H. ROE
ATTORNEY

INVENTOR
JOHN H. ROE
ATTORNEY

Patented Apr. 21, 1953

2,635,514

UNITED STATES PATENT OFFICE 2,635,514

FOCUSING MECHANISM

John H. Roe, Collingswood, N. J., assignor to Radio Corporation of America, a corporation of Delaware Application November 3, 1951, Serial No. 254,670

6 Claims. (Cl. 95—45)

1

This invention relates to improvements in a combined lens selector and focusing mechanism, and more particularly, but not necessarily exclusively, to a lens selector combined with an improved focusing mechanism for use in television and motion picture cameras, or the like.

In the television and motion picture art, it is well known to equip a camera with several lenses of various focal lengths to provide a versatile means for securing different sized images on the face of a light sensitive element.

It will be appreciated that lens systems for use in television and motion picture photography are made up of a multiplicity of lens elements. These systems are commonly termed compound lenses. However, for the sake of convenience of description the word lens, as used herein, will include both simple and compound lens systems.

The present practice in both television and motion picture photography is to mount several lenses on a rotatable turret at the front of the camera. When it is desired to use a lens of a certain focal length it is necessary to rotate the turret until the selected lens is in the proper position to provide an image on the face of the light sensitive tube or film. The various focal length lenses are usually placed on the turret so that when a scene is being photographed at optical infinity the image produced by each lens will be in the same focal plane, and a change from one lens to another will not disturb the focus of the camera. However, when the scene is not at optical infinity the image produced by each of several lenses of various focal lengths will be in a different focal plane. In the use of prior art television and motion picture cameras, it is necessary to refocus the camera by manually moving the light sensitive element or the lens system whenever a lens of different focal length is substituted for the one in use. This is accomplished by a manual movement of the regular focus control on the camera. In situations where it is desired to reproduce a continuous sequence of events, the time required to refocus the camera results in a disturbing interruption.

An object of this invention is to provide an improved focusing mechanism in which an optical system is refocused automatically when a lens of a different focal length is substituted for the one in use.

Another object of the present invention is to provide an improved focusing mechanism wherein the limits of travel of the manual means for focusing is the same when lenses of different focal lengths are used.

2

A still further object of the present invention is to provide a focusing mechanism in which the manual means for focusing remains in a fixed position when lenses of different focal lengths are used to photograph a scene at a given distance from the camera.

According to the present invention, a cam is coupled to a tiltable guide, the tiltable guide being adapted to control the movement of a member linked to either the light sensitive element or the lens system. The tiltable guide translates the position of the member, and hence the light sensitive element or the lens system, to refocus the camera when a lens of a different focal length is substituted for the one in use.

Other and incidental objects of this invention will become apparent upon a reading of the following specification and an inspection of the drawings in which.

Figure 1:
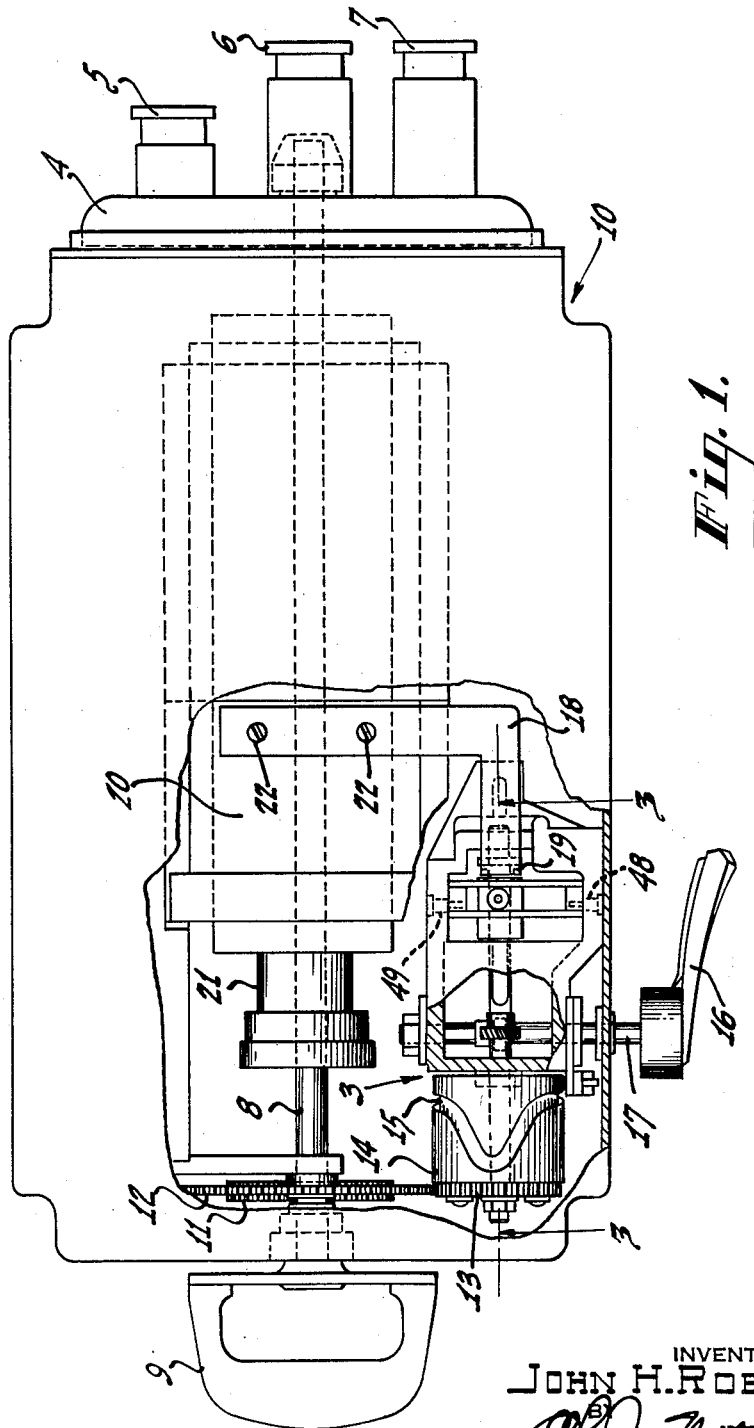
Figure 1 is a top plan view of a television camera, with a part thereof broken away, including an illustrative embodiment of the present invention.

Referring to the drawings in detail, the reference characters of which indicate similar parts throughout the several views, Fig. 1 shows a top view of a television camera 10 selected as a setting for the present invention. In the broken away portion of the top of the camera 10, the numeral 3 designates generally an embodiment of the focusing mechanism of the present invention adapted for use in a television camera such, for example, as the camera 10. A turret 4 is at the front of the camera and attached thereto are four lenses of various focal lengths, three of which are visible and are designated 5, 6, and 7. The fourth lens is not visible since it is located below lens 6. The turret 4 is attached to a camera turret shaft 8 which is connected to a handle 9 to provide means for the selection of any one of the various lenses. A gear 11 is attached to the shaft 8 and is in mesh with an idler gear 12. The idler gear 12 is in mesh with a gear 13 which is attached to a cam 14 having a groove 15. The gear 13 and the cam 14 are included in the focus mechanism 3, the details of which will be later described.

A handle 16 attached to a shaft 17 provides means for manual adjustment of the focus mechanism 3. A member 18 having a forked end 19 links the focus mechanism 3 to a carrier 20 for a camera tube 21. Only the end of the camera tube 21 is visible in the broken away portion of the figure. The camera tube 21 may be an image orthicon or other suitable type. The member 18 is attached to the carrier 20 by means of screws 22 and 23 or other suitable fastening means. The frame 38 of the focus mechanism 3 is attached to the camera 10 by suitable fastening means.

Figure 3:
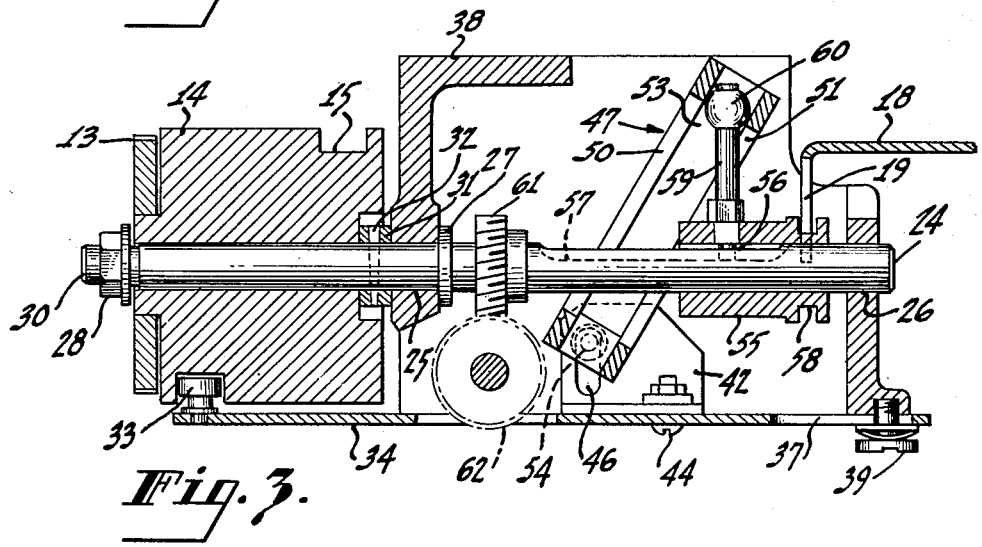
Figure 3 is a sectional view taken on line 3—3 of Fig. 1 as viewed in the direction of the arrows with the parts in a different position of operation than in Fig. 1.
Figure 5:
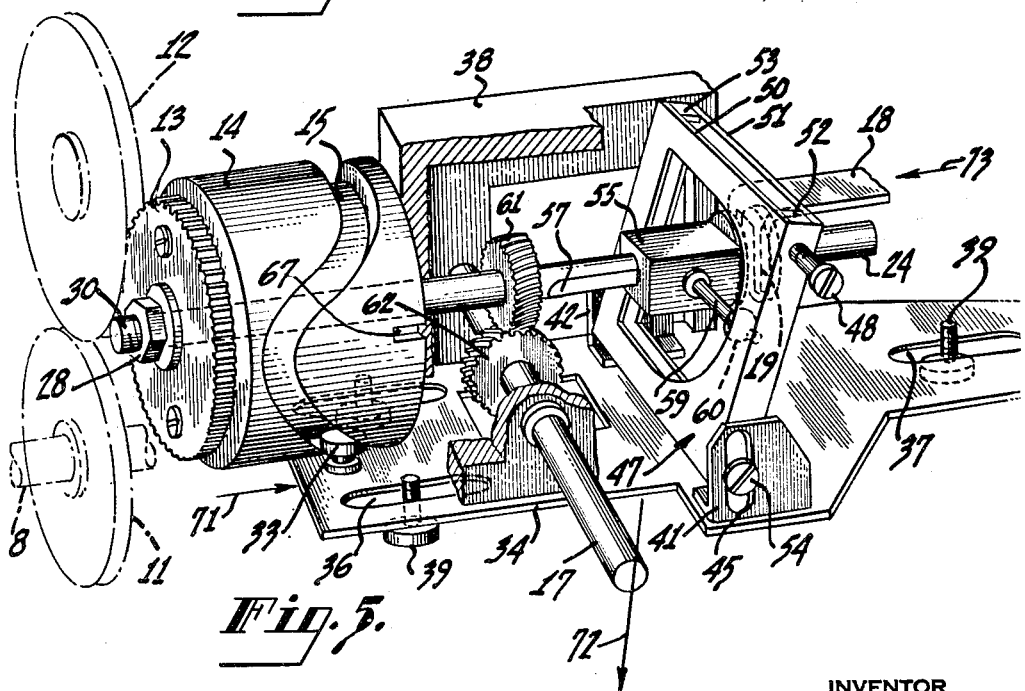
Figure 5 shows, by means of another cutaway perspective, the embodiment shown in Fig. 4 in another position of operation.

The cam 14 is journaled on shaft 24. Thus cam 14 is free to rotate independently of shaft 24, but is held in place axially by a nut assembly 28 associated with the threads 30 at the end of shaft 24 and a spacer 31 (Fig. 3) attached to shaft 24 by means of a tapered pin 32. The shaft 24 is supported by the frame 38 and has as its bearing surfaces points 25 and 26 (Fig. 3). The collar 27 on shaft 24 working in conjunction with spacer 31 holds the shaft 24 in fixed position axially with respect to frame 38 of the focusing mechanism 3. A cam follower 33 is attached to a base plate 34 and occupies a portion of the cam groove 15. Three slot shaped holes 35, 36, and 37 are provided in the base plate 34 which is movable with respect to the frame 38. Associated with each slot shaped hole is a screw 39 thereby providing sliding supports between the base plate 34 and the frame 38. The third screw 39 occupies the slot shaped hole 35 which is shown in Fig. 5.

Two brackets 41 and 42 are fastened to base plate 34. The bracket 41 is fastened to the base plate 34 by means of a screw and nut 43 or other suitable fastening means. The bracket 42 is similarly attached to base plate 34 by a screw and nut 44. Each bracket 41 and 42 is provided with a slot shaped hole 45 and 46, respectively. A tiltable guide 47 is pivoted to the frame 38 by pins 48 and 49. The tiltable guide, in the illustrative example, is composed of two plates 50 and 51 separated by and attached to two blocks 52 and 53. A screw 54, or the like, attached to the tiltable guide 47 and occupying a portion of the slot shaped hole 45 in the bracket 41 provides a lost motion linkage. Similarly a screw 54 occupying a portion of slot shaped hole 46 in bracket 42 provides an aligned cooperating lost motion linkage at the opposite side of tiltable guide 47.

A yoke 55 is attached to the shaft 24 by means of a spline 56 engaged in a keyway or groove 57 in the shaft 24. Yoke 55 has an annular groove 58 peripherally located around one end. The previously mentioned forked end 19 of member 18 is positioned to occupy a portion of this annular groove 58. Attached to the yoke 55 is an arm 59 which has a rotatable spherical bearing 60 at one end. This bearing 60 is positioned to occupy the space between the plate 50 and the plate 51 of the tiltable guide 47.

A helical gear 61 is attached to the shaft 24 and is in mesh with another helical gear 62 which is attached to the shaft 17.

Figure 2:
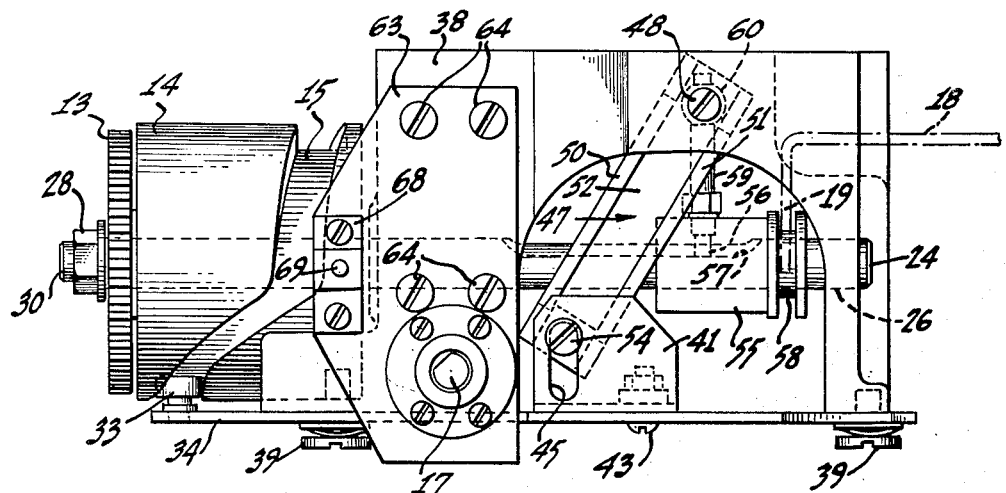
Figure 2 is a view in side elevation of the embodiment of Fig. 1 separated from the camera.

Included in the apparatus of Fig. 2 is an indexing arrangement which may, if desired, be used for initially calibrating focus mechanism 3. A plate 63 is fastened to the frame 38 by means of four screws 64 or other suitable fastening means. Suitably attached to the plate 63 is a guide 68 for an axially movable indexing pin 69. The focus mechanism 3 may be initially calibrated by rotating the cam 14 until the index pin 69 can be thrust into the slot 67 of the cam 14. With the cam 14 in this position the angle of the tiltable guide 47 is then adjusted until the yoke 55 is in the desired position.

Figure 4:
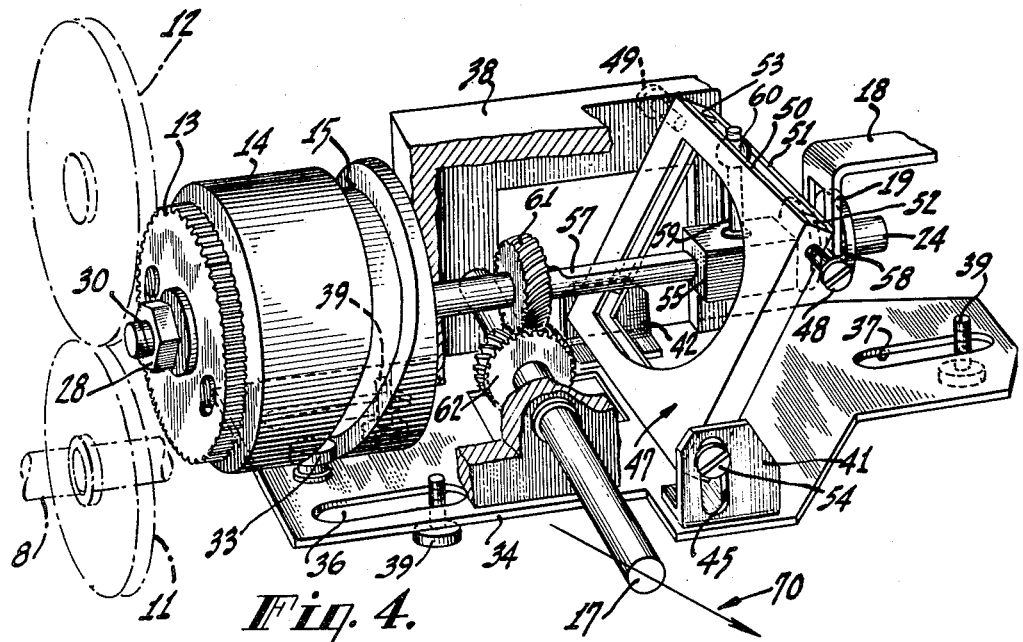
Figure 4 shows a cutaway perspective of the illustrative embodiment of the present invention in one position of operation.

The operation of the focus mechanism 3 will now be considered. When the handle 16 is manipulated to turn the shaft 17, the gear 62 rotates causing shaft 24 to turn. Since the yoke 55 is splined to shaft 24 it follows the rotational movement of shaft 24. However, yoke 55 is free to move lengthwise on shaft 24 by virtue of the spline 56 working in conjunction with the groove 57 in the shaft 24. The rotatable spherical bearing 60 sliding in the tiltable guide 47 determines the axial movement of yoke 55 with respect to shaft 24. Thus it is seen that the movement of yoke 55 is dependent upon the position of tiltable guide 47 since the bearing 60 attached to the arm 59 is obliged to slide between the plates 50 and 51 of the tiltable guide 47. The yoke 55 is shown in Fig. 4 in its position of maximum movement forward or away from the mechanism as a whole. An arrow 70 is shown at the end of shaft 17 to indicate the position of the shaft 17 when the yoke 55 is at its maximum movement forward.

When the cam 14 is turned, the cam follower 33 moves the base plate 34 in accordance with the configuration of groove 15 in the cam 14. This moves brackets 41 and 42 and transfers the motion to the tiltable guide 47. Since the tiltable guide 47 is pivoted to the frame 38 by means of pins 48 and 49, the angle of the tiltable guide 47 with reference to the shaft 24 will be varied in accordance with the configuration of the groove 15 in the cam 14.

In Fig. 5 the cam 14 has been moved to another position and moving the base plate 34 in the direction indicated by arrow 71, thereby changing the angle of the tiltable guide 47 relative to the shaft 24. Also the position of the shaft 17 has been changed as indicated by arrow 72 and the yoke 55 is no longer at one end of its limit of movement. The arm 59 and bearing 60 have followed the rotational movement of the shaft 24 and have moved axially with respect to shaft 24 due to the operation of the tiltable guide 47 in cooperation with bearing 60. Thus the spline 54 has transferred the rotational movement of shaft 24 to the yoke 55, but since the arm 59 is rigidly attached to the yoke 55 and the bearing 60 attached to the arm 59 is bound to slide between the plates 51 and 53 of the tiltable guide 47, yoke 55 has moved along shaft 24 a function of the angle of tiltable guide 47. An arrow 73 indicates the direction of this movement.

The operation of the present invention as applied in combination with the television camera 10 of Fig. 1 is as follows:

The operator of a television camera initially focuses the camera on a distant scene by means of handle 16. Rotational movement of the shaft 17 causes an axial movement of the yoke 55 as previously described. This axial movement is transferred to the carrier 20 and hence to camera tube 21 by means of the forked member 18 working in conjunction with the annular groove 58 of the yoke 55. When it is desired to use a lens of a different focal length, the operator may grasp the handle 9 and rotate it to turn the turret 4 until the desired lens is in the proper position. This rotational movement of the handle 9 is transferred to the turret 4 through the shaft 8. The gear 11 rotates the gear 13 and the cam 14 through the gear 12. The configuration of the cam groove 15 in conjunction with the cam follower 33 translates this rotational movement into a longitudinal movement of the base plate 34. The configuration of the groove 15 of the cam 14 is made to correspond to focusing requirements of the various lenses attached to the turret 4. The cam follower 33 following the configuration of the cam groove 15 moves the base plate 34 to a new position changing the angle of the tiltable guide 47. This change in angle of the tiltable guide 47 transfers a lateral movement to the bearing 60 and through the arm 59 to the yoke 55 an amount depending upon the position of the bearing 60 in the tiltable guide 47. Thus it will be seen that when the shaft 17 is in the position shown in Fig. 4 no lateral movement will be imparted to the bearing 60 due to the change in angle of the tiltable guide 47 because the bearing 60 is on the pivotal axis of the tiltable guide 47. However, a consideration of Fig. 5 will show that when the shaft 17 is in any other position but the one shown in Fig. 4 the bearing 60 will be in a position in the tiltable guide 47 so that an axial movement will be imparted to the yoke 55 due to the change in angle of the tiltable guide 47. The configuration of the cam 14 may be made to translate the position of the yoke 55 an amount as required by the focal length of the lenses so that when the operator substitutes one lens for another, the light sensitive device will be moved to a new position and the camera will remain in focus on a scene the same distance from the camera as before the substitution. It will be noted that the shaft 17 and hence the focus handle 16 will remain in a fixed position for any given distance from the camera.

It will be appreciated that the camera shown in Fig. 1 is merely illustrative of a conventional type of television camera, and that the details of the attachment and mode of connection between the present invention and the camera, as well as the means for changing from one lens to another, may be modified in many ways without departing from the spirit of the invention as defined in the appended claims.

What is claimed is:

1. In an optical system including a plurality of lenses and a light sensitive element, the combination of, means for changing from one of said plurality of lenses to another of said plurality of lenses, means for varying the distance between said light sensitive element and said plurality of lenses linked to said means for changing from one lens of said plurality of lenses to another of said plurality of lenses, said means for varying said distance between said light sensitive element and said plurality of lenses including a shaft, a yoke splined to said shaft, an arm attached to said yoke, a bearing attached to one end of said arm, a tiltable guide having means to receive said bearing, said bearing being disposed to slide in the bearing receiving means of said tiltable guide, means for transferring the motion of said yoke to said light sensitive element, means for rotating said shaft, means for changing the angle of said tiltable guide with respect to said shaft, and means for linking said means for changing the angle of said tiltable guide to said means for changing from one of said plurality of lenses to another of said plurality of lenses.

2. In an optical system having a plurality of lenses, a light sensitive element, and means for changing from one of said plurality of lenses to another of said plurality of lenses, a focus mechanism including the combination of, means for varying the distance between said light sensitive element and said plurality of lenses, a frame, a shaft, a yoke splined to said shaft, means for linking said yoke to said means for varying the distance between said light sensitive element and said plurality of lenses, an arm rigidly attached to said yoke, a bearing attached to one end of said arm, a tiltable guide having means to receive said bearing, said bearing being disposed to slide in the bearing receiving means of said tiltable guide, said tiltable guide being pivoted to said frame, a base plate, means for linking said tiltable guide to said base plate, a cam, a cam follower attached to said base plate, means for rotating said shaft, and means for linking said cam to said means for changing from one of said plurality of lenses to another of said plurality of lenses.

3. In an optical system as described in claim 2, said means for changing from one of said plurality of lenses to another of said plurality of lenses including a turret, a turret shaft, said turret being attached to one end of said turret shaft, said plurality of lenses being attached to said turret, and means for rotating said turret shaft.

4. In an optical system having a plurality of lenses, the combination of, a light sensitive element, a turret, a turret shaft, said turret being attached to said turret shaft, said plurality of lenses being attached to said turret, and a focus mechanism, said focus mechanism comprising a frame, a shaft, a yoke splined to said shaft, an arm attached to said yoke, a bearing attached to one end of said arm, a tiltable guide having means to receive said bearing, said bearing being disposed to slide in said bearing receiving means of said tiltable guide, said tiltable guide being pivoted to said frame, a cam follower, means for changing the angle of said tiltable guide with respect to said shaft, means for linking said cam follower to said means for changing the angle of said tiltable guide, a gear train having a plurality of gears, one of said plurality of gears being attached to said cam, another of said plurality of gears being attached to said turret shaft, an annular groove around said yoke, a forked member disposed to occupy a portion of said annular groove, a carrier for said light sensitive element, means for linking said forked member to said carrier, means for rotating said shaft, and means for rotating said turret shaft.

5. In an optical system having a plurality of lenses and a light sensitive element for optical association selectively with each of said lenses, in combination, means for changing from one of said plurality of lenses to another of said plurality of lenses, means for varying the distance between said light sensitive element and said plurality of lenses, said distance varying means including a shaft, a yoke attached to said shaft by means of a spline, an arm attached to said yoke, a bearing attached to one end of said arm, a tiltable guide having means to receive said bearing, said bearing being disposed to slide in the bearing receiving means of said tiltable guide, means for linking said yoke to said light sensitive element, means for rotating said shaft, and means actuated by said means for lens changing for tilting said tiltable guide.

6. A focusing mechanism for use in an optical system having an image receiving means and an image forming means, said focusing mechanism including the combination of, adjustable focusing means adapted to vary the distance between said image receiving means and said image forming means, a shaft, a yoke splined to said shaft, an arm attached to said yoke, a bearing attached to one end of said arm, a tiltable guide having means to receive said bearing, said bearing being disposed to slide in the bearing receiving means of said tiltable guide, a cam, a cam follower, means for changing the angle of said tiltable guide with respect to said shaft, means linking said cam follower to said angle changing means, means for rotating said cam, means for rotating said shaft, and means coupling said adjustable focusing means to said yoke.

JOHN H. ROE.

References Cited in the file of this patent

UNITED STATES PATENTS

| Number | Name | Date |
|---|---|---|
| 2,000,090 | Mitchell | May 7, 1935 |
| 2,572,729 | Jackson et al. | Oct. 23, 1951 |

FOREIGN PATENTS

| Number | Country | Date |
|---|---|---|
| 908,653 | France | Oct. 11, 1945 |